Patented May 15, 1951

2,552,874

UNITED STATES PATENT OFFICE 2,552,874

METHOD OF PHOSPHATIZING FERRIFEROUS SURFACES

Eugene Snyder and Ferdinand P. Heller, Philadelphia, Pa., assignors to American Chemical Paint Company, Ambler, Pa., a corporation of Delaware No Drawing. Application May 1, 1950,
Serial No. 159,366

2 Claims. (Cl. 148—6.15)

1

This invention relates to the art of finishing ferriferous surfaces with a coat of paint, varnish, enamel, japan or other similar siccative coating and is particularly concerned with processes which involve phosphatizing the surface in preparation for the reception of such final siccative coatings.

It has been known heretofore that phosphatizing solutions containing both primary and/or secondary phosphates from the class of alkali and ammonium phosphates will produce excellent close grained, water insoluble, adherent coatings on ferriferous surfaces where the pH of the coating solution is maintained within certain limits, preferably within a range of from 4.7 to 6.0. A typical example is disclosed in United States patent to Douty and Romig, No. 2,403,426, where the range of pH extends from 4.7 to 6.5.

However, there are some surfaces which are relatively difficult to coat with the solutions just described, resulting in unevenness in appearance due to the development of light and dark areas which, while not necessarily objectionable from the standpoint of corrosion resistance, are sometimes undesirable for other reasons. For example, if a very thin film of paint or other siccative coating is subsequently applied to such an uneven phosphate coating it sometimes happens that there is an undesirable variation in the gloss of the painted surface. In such instances it has been customary to reduce the pH of the coating solution in an effort to overcome the difficulty. However, the phosphate coatings which are produced by means of a solution having a pH lower than approximately 4.5, although continuous and even-appearing to the eye, are definitely inferior in quality to the coatings produced by means of solutions lying within the range given.

The principal objects of the present invention are to provide a method of phosphatizing ferriferous surfaces with the type of solutions referred to wherein the phosphate coating itself as well as the final siccative coating applied thereto are greatly improved in character particularly with respect to uniformity in appearance, length of life, degree of adherence and paint bonding ability.

We have discovered that if the coating solutions of primary and/or secondary phosphates in the class of alkali and ammonium phosphates

2 are applied to the ferriferous surfaces in two steps wherein the solution or bath of the first step has a pH which is at least 0.2 unit lower than that of a second bath which has a pH of from 4.7 to 6.2 and preferably from 5.5 to 6.0, it is possible to produce on the metal unusually excellent, even, continuous close grained, water insoluble and adherent coatings having outstanding paint bonding ability. As just stated, the pH of the first treating solution or bath must be at least 0.2 unit lower than the subsequent treating solution. Where such subsequent solution has a pH of 5.6 or higher the first solution may be even more than one full pH unit lower but in no case is it necessary for the first solution to be below a pH of 4.0. In fact, it is undesirable to reduce the pH of the first solution below 4.0 because such solutions have to be handled in stainless steel or other acid resistant equipment. Moreover, if the solution be reduced below a pH of 4.0, because of the relatively high acidity of such a solution, there is a tendency to undesirably lower the pH of subsequent solutions because of the drag out on the surface of the work.

Our improved process may be employed in the conventional manner, i. e. by dipping or spraying. The length of time that the metal is exposed to treatment by the first bath is not critical although we have found it advisable to expose the metal for approximately the same length of time in each of the two solutions. However, with our new process, it is not necessary to lengthen the total treating time over what has been customary in prior processes involving similar solutions. For instance, if a surface was being sprayed in the conventional process for two minutes in a multiple stage machine, it is also possible with our new process to employ the same time cycle although the first phosphatizing stage of our process will be operated with the lower pH material and the last stage with the higher pH material.

As is the case in the prior art, with our new process it is also possible to take advantage of the effects of detergents, emulsifying agents, accelerators, etc., added to the solutions of both high and low pH.

By way of illustration we cite the following example:

The first two stages of a conventional six stage spray phosphatizing machine are charged with the solution according to the following formula:

| | Oz. per gallon of water |
|---|---|
| Mono ammonium phosphate | 1.85 |
| Disodium phosphate | 0.15 |
| Organic detergent [1] | 0.10 |

[1] The organic detergents may be any of those customarily used in phosphatizing solutions of this type, especially those with good emulsifying and wetting power. As examples of suitable materials, we may use sodium lauryl sulfate (sold to the trade under the name of "Dupanol"); sulfonated hydrocarbon such as alkylated naphthalene sulfonic acids, etc. (sold to the trade under brand names such as "Santomerse," "Naccanol," etc.); and non-ionic detergents which are derivatives of polyethylene glycol (sold under such trade names as "Igepal," "Triton NE," etc.). In general any organic detergent sufficiently soluble and stable at the pH of the solution and of adequate cleaning power may be used.

The pH of the above solution is adjusted to 5.4.

The next two stages of a conventional six stage machine are also charged with the same material except that the pH of the solution is adjusted to 5.6.

The fifth stage is a conventional water rinse and the final or sixth stage may be used for the conventional acidulated rinse normally employed before applying the siccative coat.

Both of the treating solutions may be used at conventional temperatures—around 160° F., and the surface to be coated is subjected to the spray for a total time of approximately two minutes. It is not necessary to rinse the work after it leaves the low pH solutions and before it enters the high pH solutions.

It should be understood, of course, that it is not absolutely essential that six stage machines be employed although our process is very satisfactorily conducted in such conventional machines. The important thing is to provide for treatment of the surface in two successive baths, each of which consists essentially of an aqueous solution of both primary and secondary phosphates from the class which consists of alkali metals and ammonium with the second bath having a pH adjusted to from 4.7 to 6.2 and the first to a pH which is at least 0.2 unit lower than the second but never below 4.0. Furthermore, we have found that best results are secured where the second solution has a pH of from 5.5 to 6.0.

We should like to call attention to the fact that occasionally there are surfaces which are so passive that it will be necessary to reduce the pH of the first treating bath by more than 0.2 pH unit but it will never be necessary to go below 4.0. Such an adjustment, of course, may readily be accomplished by the addition of a small amount of phosphoric acid.

We claim:

1. In the art of phosphatizing ferriferous surfaces, the method which includes treating the surface with two successive baths each consisting essentially of an aqueous solution of both primary and secondary phosphates from the class which consists of alkali metals and ammonium, the second of said baths being adjusted to a pH of from 4.7 to 6.2 and the first to a pH which is at least 0.2 unit lower than the second but never below a pH of 4.

2. The method of claim 1 wherein the second solution has a pH of from 5.5 to 6.0.

EUGENE SNYDER.
FERDINAND P. HELLER.

REFERENCES CITED

The following references are of record in the file of this patent:

UNITED STATES PATENTS

| Number | Name | Date |
|---|---|---|
| 1,219,526 | Allen | Mar. 20, 1917 |
| 2,403,426 | Douty et al. | July 2, 1946 |
| 2,514,149 | Amundsen | July 4, 1950 |